(12) United States Patent
Tanabe et al.

(10) Patent No.: US 11,590,861 B2
(45) Date of Patent: Feb. 28, 2023

(54) VEHICLE SEAT

(71) Applicant: TS TECH CO., LTD., Saitama (JP)

(72) Inventors: Jinichi Tanabe, Tochigi (JP); Kenichi Niitsuma, Tochigi (JP); Hidetoshi Ozawa, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 340 days.

(21) Appl. No.: 16/623,969

(22) PCT Filed: Jun. 13, 2018

(86) PCT No.: PCT/JP2018/022569
§ 371 (c)(1),
(2) Date: Dec. 18, 2019

(87) PCT Pub. No.: WO2018/235695
PCT Pub. Date: Dec. 27, 2018

(65) Prior Publication Data
US 2021/0146804 A1 May 20, 2021

(30) Foreign Application Priority Data

Jun. 20, 2017 (JP) .............................. JP2017-120578
Jun. 20, 2017 (JP) .............................. JP2017-120601

(51) Int. Cl.
*B60N 2/06* (2006.01)
*B60N 2/14* (2006.01)
*B60N 2/30* (2006.01)

(52) U.S. Cl.
CPC ................. *B60N 2/06* (2013.01); *B60N 2/14* (2013.01); *B60N 2/305* (2013.01); *B60N 2205/30* (2013.01)

(58) Field of Classification Search
CPC . B60N 2/06; B60N 2/08; B60N 2/062; B60N 2/14; B60N 2/146
(Continued)

(56) References Cited

U.S. PATENT DOCUMENTS 1,250,155 A * 12/1917 Martin ..................... B60N 2/14
297/344.21
1,932,241 A * 10/1933 Brown ..................... B60N 2/40
248/598
(Continued)

FOREIGN PATENT DOCUMENTS

EP 1710119 10/2006
JP S63180535 7/1988
(Continued)

OTHER PUBLICATIONS

International Search Report for PCT/JP2018/022569 dated Aug. 13, 2018, 4 pages.
(Continued)

*Primary Examiner* — Dennis H Pedder
(74) *Attorney, Agent, or Firm* — Dority & Manning, P.A.

(57) ABSTRACT

To make a rotatable vehicle seat be rotatable in a small space, in a vehicle seat (1) including a seat cushion (7) provided on a floor (2) of a vehicle and a seat back (8) provided on the seat cushion, the seat cushion is provided on the floor so as to be rotatable about a selected one of multiple rotation axes (A) extending substantially vertically. Preferably, a rotation device (4) is provided between the floor and the seat cushion, the rotation device being configured to enable rotation about the selected one of the multiple rotation axes while restricting rotation about any of the remaining rotation axes.

4 Claims, 16 Drawing Sheets

(58) Field of Classification Search
USPC .......................................... 296/65.06, 65.07
See application file for complete search history.

(56) References Cited

U.S. PATENT DOCUMENTS

| | | | | |
|---|---|---|---|---|
| 3,964,713 | A * | 6/1976 | Joslyn | B60N 2/02 |
| | | | | 297/344.22 |
| 6,199,931 | B1 * | 3/2001 | Shaw | B60N 2/14 |
| | | | | 296/65.01 |
| 7,121,608 | B2 * | 10/2006 | Billger | B60N 2/38 |
| | | | | 297/344.22 |
| 7,862,287 | B2 * | 1/2011 | Egan | B60N 2/245 |
| | | | | 414/921 |
| 10,195,964 | B2 * | 2/2019 | Martin | B60N 2/39 |
| 2003/0141736 | A1 | 7/2003 | Chernoff et al. | |
| 2006/0226685 | A1 | 10/2006 | Priepke et al. | |
| 2008/0018141 | A1 | 1/2008 | Bernstein et al. | |
| 2009/0033132 | A1 | 2/2009 | Lhomme et al. | |

FOREIGN PATENT DOCUMENTS

| | | |
|---|---|---|
| JP | 2003-063287 | 3/2003 |
| JP | 2008024197 | 2/2008 |
| JP | 2009-220644 | 10/2009 |
| JP | 2009262803 | 11/2009 |
| JP | 2010173491 | 8/2010 |
| JP | 2013216209 | 10/2013 |
| JP | 2014024407 | 2/2014 |
| JP | 2016097780 | 5/2016 |
| JP | 2017074922 | 4/2017 |

OTHER PUBLICATIONS

Japanese Office Action (with English translation) for corresponding Japanese Patent Application No. 2017-120578, dated Jun. 1, 2021—8 pages.

Japanese Office Action (with English translation) for corresponding Japanese Patent Application No. 2017-120601, dated Jun. 1, 2021—6 pages.

* cited by examiner

VEHICLE SEAT

CROSS REFERENCE TO RELATED APPLICATIONS

This application is the U.S. National Stage entry of International Application Number PCT/JP2018/022569 filed under the Patent Cooperation Treaty having a filing date of Jun. 13, 2018, which claims priority to Japanese Patent Application No. 2017-120578 having a filing date of Jun. 20, 2017, and Japanese Patent Application No. 2017-120601 having a filing date of Jun. 20, 2017, which are incorporated herein by reference.

TECHNICAL FIELD

The present invention relates to a vehicle seat to be installed in a motor vehicle or the like.

BACKGROUND ART

A seat provided on a floor of an automobile to be rotatable about an axis extending substantially vertically is known (e.g., Patent Document 1). This seat can achieve various seat arrangements suitable for the occupants to have conversation, relax, or enjoy the outside view depending on the rotational position of the seat. If this seat is adopted in an autonomous-driving vehicle, the driver's seat also can have various positions during autonomous driving.

PRIOR ART DOCUMENT(S)

Patent Document(s)

Patent Document 1: JP2016-97780A

SUMMARY OF THE INVENTION

Task to be Accomplished by the Invention

Since structural members constituting the motor vehicle, such as the doors, pillars, dash board, center console, etc., are present around the seat, it is difficult to secure a rotation space for the seat. Particularly, since the rear part of the seat is provided with a seat back that projects rearward, it is difficult to avoid contact with a passenger compartment side wall. Therefore, a seat that can rotate in a small space while avoiding contact with the surrounding structural members is desired.

In view of the foregoing background, an object of the present invention is to provide a rotatable vehicle seat that can be rotated in a small space.

Means to Accomplish the Task

To achieve the above object, one aspect of the present invention provides a vehicle seat (1) comprising a seat cushion (7) provided on a floor (2) of a vehicle and a seat back (8) provided on the seat cushion, wherein the seat cushion is provided so as to be rotatable relative to the floor about a selected one of multiple rotation axes (A) extending substantially vertically.

According to this configuration, the vehicle seat can move to various positions by rotating about a rotation axis selected from the multiple rotation axes. This allows the vehicle seat to rotate in a small space so as to avoid a surrounding structural member.

In the above aspect, preferably, a rotation device (4) is provided between the floor and the seat cushion, the rotation device being configured to enable rotation about the selected one of the multiple rotation axes while restricting rotation about any of the remaining rotation axes.

According to this configuration, the rotation axis can be fixed to the selected one by the rotation device, and the vehicle seat can rotate smoothly with the restricted rotation mode.

In the above aspect, preferably, the rotation device is configured to select the rotation axis about which the rotation is enabled in accordance with a rotation direction.

According to this configuration, the vehicle seat can rotate so as to avoid the surrounding structural member by selecting the rotation axis in accordance with the rotation direction.

In the above aspect, preferably, the rotation axes include a front rotation axis (A1, A2) located in a front part of the seat cushion and a rear rotation axis (A3, A4) located in a rear part of the seat cushion, and the rotation device enables rotation of the seat cushion about the rear rotation axis at a time of an inward rotation for turning the front part of the seat cushion relative to the rear part of the seat cushion inward with respect to a widthwise direction of the vehicle.

According to this configuration, the vehicle seat can avoid contact between the seat back and a structural member located on an outer side with respect to the widthwise direction of the vehicle at the time of inward rotation.

In the above aspect, preferably, the rear rotation axis (A3) is located more inward with respect to the widthwise direction of the vehicle than a widthwise center of the seat cushion.

According to this configuration, the vehicle seat can avoid contact between the seat back and a structural member located on an outer side with respect to the widthwise direction of the vehicle even more reliably at the time of inward rotation.

In the above aspect, preferably, the rotation axes include a front rotation axis (A1, A2) located in a front part of the seat cushion and a rear rotation axis (A3, A4) located in a rear part of the seat cushion, and the rotation device enables rotation of the seat cushion about the front rotation axis at a time of an outward rotation for turning the front part of the seat cushion relative to the rear part of the seat cushion outward with respect to a widthwise direction of the vehicle.

According to this configuration, the vehicle seat can avoid contact between the front end of the seat cushion and a structural member located on an outer side with respect to the widthwise direction of the vehicle at the time of outward rotation.

In the above aspect, preferably, the rotation device comprises multiple rotation shaft units (17), and each of the multiple rotation shaft units comprises: a lower rail (21) fixed to the floor and extending in a first horizontal direction; an upper rail (22) fixed to the seat cushion and extending in a second horizontal direction different from the first horizontal direction; a lower slider (23) provided on the lower rail to be slidably movable thereon; an upper slider (24) provided on the upper rail to be slidably movable thereon and coupled with the lower slider to be rotatable about an axis extending substantially vertically; and a restriction member (25, 26) configured to selectively restrict movement of the lower slider relative to the lower rail and movement of the upper slider relative to the upper rail.

According to this configuration, it is possible to constitute a rotation device that can select one of the multiple rotation axes and rotate thereabout.

In the above aspect, preferably, the rotation device comprises multiple rotation members (52, 53, 54) that are arranged in a vertical direction, multiple rotation shafts (55, 56) rotatably connecting vertically adjacent ones of the rotation members, and a restriction device (57, 58) configured to selectively restrict rotation of the vertically adjacent ones of the rotation members.

According to this configuration, the rotation device that can select one of the multiple rotation axes and rotate thereabout can be made simple in structure.

Another embodiment of the present invention comprises: a rotation device (71) having a lower rotation member (72) provided on a floor of a vehicle and an upper rotation member (73) provided on the lower rotation member to be rotatable about a rotation axis extending substantially vertically; a slide device (3) having a lower slide rail (12) coupled with the upper rotation member and an upper slide rail (13) movably provided on the lower slide rail; a seat cushion (7) coupled with the upper slide rail; and a seat back (8) provided on the seat cushion.

According to this configuration, even though there is a single rotation axis, it is possible to change the position of the center of rotation of the seat cushion since the seat cushion can move relative to the rotation axis.

In the above aspect, preferably, a rotation direction of the upper rotation member relative to the lower rotation member is restricted in accordance with a position of the upper slide rail relative to the lower slide rail.

According to this configuration, by restricting the rotation direction in accordance with the position of the center of rotation of the seat cushion, it is possible to avoid contact of the seat cushion and the seat back with a structural member of the vehicle.

Also, when the seat is configured to be rotatable, it is necessary to make the buckle of the seat belt movable relative to the floor such that even when the seat is rotate, the buckle is placed at an appropriate position corresponding to the rotational position of the seat. As one technique to make the buckle movable, it is conceivable to provide the buckle on a rotatable part of the seat such that the buckle is rotated together with the seat. However, according to this technique, the inertial force acting on the occupant at the time of collision or the like is applied to the rotation shaft of the seat via the seat belt and the seat, and therefore, it is necessary to increase the stiffness of rotation shaft, which may increase the size and the weight of the seat. Thus, there is an object to reduce the load applied to the rotation shaft in the rotatable vehicle seat.

To achieve the above object, another aspect of the present invention provides a vehicle seat (101) comprising: a rotation device (103) provided on a floor (102) of a vehicle and supporting a seat body (4) to be rotatable about a rotation axis (B) extending substantially vertically; and a movement device (140) provided on the floor and supporting a buckle (131) of a seat belt (125) to be movable relative to the floor, wherein the rotation device is configured to be in a lock state in which rotation is restricted and a lock release state in which the rotation is enabled, and the movement device is configured to be in a lock state in which movement is restricted and a lock release state in which the movement is restricted.

According to this configuration, the inertial force acting on the occupant at the time of collision or the like is transmitted from the seat belt to the floor via the buckle and the movement device, and therefore, it is possible to reduce the load applied to the rotation shaft of the rotation device. In addition, the position of the buckle can be changed in accordance with the rotation of the seat body. The position of the buckle can be fixed so that the movement caused by application of a load can be prevented.

In the above aspect, preferably, when the rotation device is put in the lock state, the movement device is put in the lock state, and when the rotation device is put in the lock release state, the movement device is put in the lock release state.

According to this aspect, because when the rotation device is put in the lock release state, the movement device is put in the lock release stat, the change of the buckle position in accordance with the rotation of the seat body can be achieved easily.

In the above aspect, preferably, the vehicle seat includes a common operation input device (115) for operating the rotation device and the movement device.

According to this aspect, it is possible to put both the rotation device and the movement device in the lock release state by operating the operation input device, and therefore, the operation becomes easy.

In the above aspect, preferably, the operation input device consists of a lever (159) connected to the rotation device and the movement device via control cables (114, 155).

According to this aspect, it is possible to put both the rotation device and the movement device in the lock release state by operating the lever.

In the above aspect, preferably, the movement device is movable relative to the floor along a circular arc path about the rotation axis of the rotation device.

According to this aspect, it is possible to place the buckle at an appropriate position in accordance with the rotation of the seat body.

In the above aspect, preferably, the movement device includes a rail (141) provided on the floor, a slider (142) movably provided on the rail and having the buckle attached thereto, and a lock member (151) configured to selectively fix the slider to the rail.

According to this aspect, the movement device can be simple in structure.

In the above aspect, preferably, the slider is joined to the seat body or a part of the rotation device that rotates together with the seat body.

According to this aspect, it is possible to make the buckle move automatically following the rotation of the seat body.

In the above aspect, preferably, the slider and the rotation device are joined via a drive unit (181), and the drive unit drives the slider at a rotation angle having a predetermined ratio relative to a rotation angle of the rotation device.

According to this aspect, it is possible to make the buckle move automatically following the rotation of the seat body.

In the above aspect, preferably, the slider is formed in a circular arc shape along a circular arc path about the rotation axis of the rotation device.

According to this aspect, it is possible to expand the engagement range between the slider and the rail and to increase the stiffness of the movement device.

Effects of the Invention

According to one aspect of the present invention, the vehicle seat has multiple rotation axes and can move to various positions by rotating about a selected one of the rotation axes. This allows the vehicle seat to rotate in a small space so as to avoid a surrounding structural member.

In the above aspect, by providing a rotation device configured to enable rotation about the selected one of the multiple rotation axes while restricting rotation about any of the remaining rotation axes multiple rotation axes, the rotation axis can be fixed to the selected one by the rotation device, and the vehicle seat can rotate smoothly with the restricted rotation mode.

In the above aspect, by configuring the rotation device to select the rotation axis about which the rotation is enabled in accordance with a rotation direction, the vehicle seat can rotate so as to avoid a surrounding structural member in accordance with the rotation direction.

In the above aspect, by configuring the rotation device to enable rotation of the seat cushion about the rear rotation axis at a time of an inward rotation of the seat cushion, it is possible to avoid contact between the seat back and a structural member located on an outer side with respect to the widthwise direction of the vehicle.

In the above aspect, by locating the rear rotation axis closer to a widthwise center of the vehicle than a widthwise center of the seat cushion, it is possible to avoid contact between the seat back and a structural member located on an outer side with respect to the widthwise direction of the vehicle even more reliably at the time of inward rotation.

In the above aspect, by configuring the rotation device to enable rotation of the seat cushion about the front rotation axis at a time of an outward rotation of the seat cushion, it is possible to avoid contact between the front end of the seat cushion and a structural member located on an outer side with respect to the widthwise direction of the vehicle.

In the above aspect, by configuring the rotation device to include multiple rotation shaft units, it is possible to constitute a rotation device that can select one of the multiple rotation axes and rotate thereabout.

In the above aspect, by configuring the rotation device to include multiple rotation members, multiple rotation shafts rotatably connecting the rotation members, and a restriction device configured to selectively restrict rotation of the rotation members, the rotation device that can select one of the multiple rotation axes and rotate thereabout can be made simple in structure.

Further, by configuring a vehicle seat to comprise: a rotation device having a lower rotation member provided on a floor of a vehicle and an upper rotation member provided on the lower rotation member to be rotatable about a rotation axis extending substantially vertically; a slide device having a lower slide rail coupled with the upper rotation member and an upper slide rail movably provided on the lower slide rail; a seat cushion coupled with the upper slide rail; and a seat back provided on the seat cushion, even though there is a single rotation axis, it is possible to change the position of the center of rotation of the seat cushion since the seat cushion can move relative to the rotation axis.

In the above aspect, by making a configuration such that a rotation direction of the upper rotation member relative to the lower rotation member is restricted in accordance with a position of the upper slide rail relative to the lower slide rail, it is possible to avoid contact of the seat cushion and the seat back with a structural member of the vehicle.

According to another aspect, a movement device supports the buckle to be movable relative to the floor, it is possible to change the position of the buckle in accordance with the rotation of the seat body. The position of the buckle can be fixed so that the movement caused by application of a load can be prevented.

In the other aspect, by making a configuration such that when the rotation device is put in the lock state, the movement device is put in the lock state, and when the rotation device is put in the lock release state, the movement device is put in the lock release state, the change of the buckle position in accordance with the rotation of the seat body can be achieved easily.

In the other aspect, by configuring the vehicle seat to include a common operation input device for operating the rotation device and the movement device, it is possible to put both the rotation device and the movement device in the lock release state, and therefore, the operation becomes easy.

In the other aspect, by making configuration such that a lever is connected to the rotation device and the movement device via control cables, it is possible to put both the rotation device and the movement device in the lock release state by operating the lever.

In the other aspect, by configuring the movement device to be movable relative to the floor along a circular arc path about the rotation axis of the rotation device, it is possible to place the buckle at an appropriate position in accordance with the rotation of the seat body.

In the other aspect, by configuring the movement device to include a rail, a slider, and a lock member, the movement device can be simple in structure.

In the other aspect, by joining the slider to the seat body or a part of the rotation device that rotates together with the seat body, it is possible to make the buckle move automatically following the rotation of the seat body.

In the other aspect, by providing a drive unit that drives the slider at a rotation angle having a predetermined ratio relative to a rotation angle of the rotation device, it is possible to make the buckle move automatically following the rotation of the seat body.

In the other aspect, by forming the slider in a circular arc shape along a circular arc path about the rotation axis of the rotation device, it is possible to expand the engagement range between the slider and the rail and to increase the stiffness of the movement device.

MODES FOR CARRYING OUT THE INVENTION

In the following, an embodiment in which a vehicle seat according to the present invention is applied to an automobile seat will be described with reference to the drawings. In the following description, the front, rear, left, and right are defined with respect to an occupant seated in the vehicle seat.

First Embodiment

Figure 1:
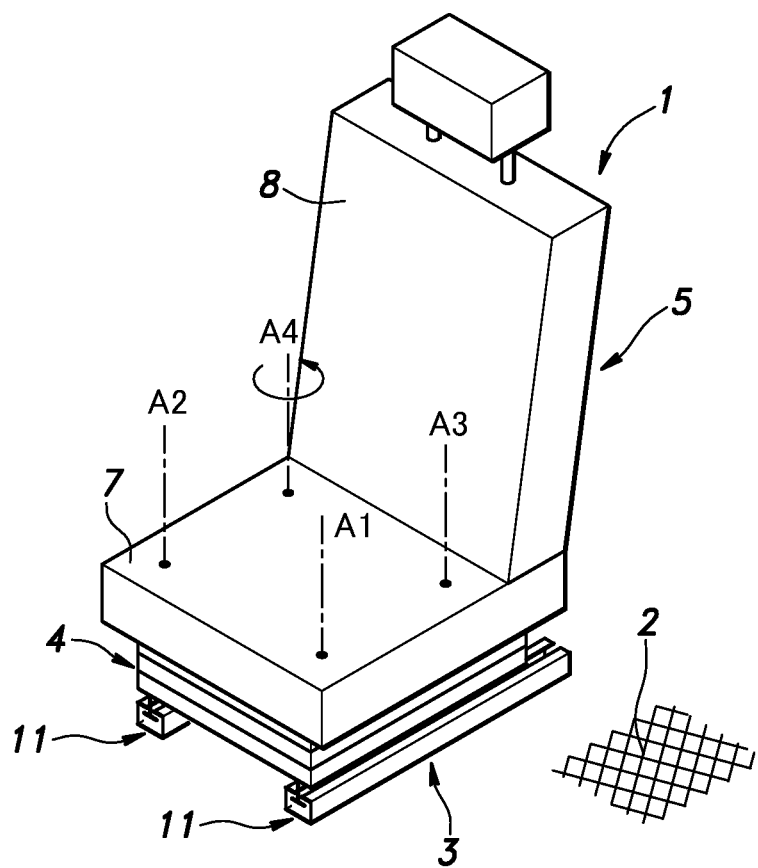
FIG. 1 is a perspective view of a seat according to the first embodiment.

As shown in FIG. 1, a seat 1 includes a slide device 3 provided on an upper surface of a floor 2 of a motor vehicle, a rotation device 4 provided on an upper part of the slide device 3, and a seat body 5 provided on an upper part of the rotation device 4. The seat 1 may be any of a driver's seat, a front passenger seat, and a rear seat. In this embodiment, the seat 1 is configured as a driver's seat located in a right front part of the passenger compartment.

The floor 2 extends substantially horizontally. The slide device 3 supports the rotation device 4 and the seat body 5 to the floor 2 so as to be slidably movable in a substantially horizontal direction relative to the floor 2. The rotation device 4 is provided on the slide device 3 so as to be rotatable relative to the floor 2 about multiple rotation axes extending substantially vertically and supports the seat body 5 so as to be rotatable relative to the floor 2 around the multiple rotation axes. The seat body 5 includes a seat cushion 7 provided on an upper part of the rotation device 4 and a seat back 8 provided on a rear part of the seat cushion 7.

Figure 2:
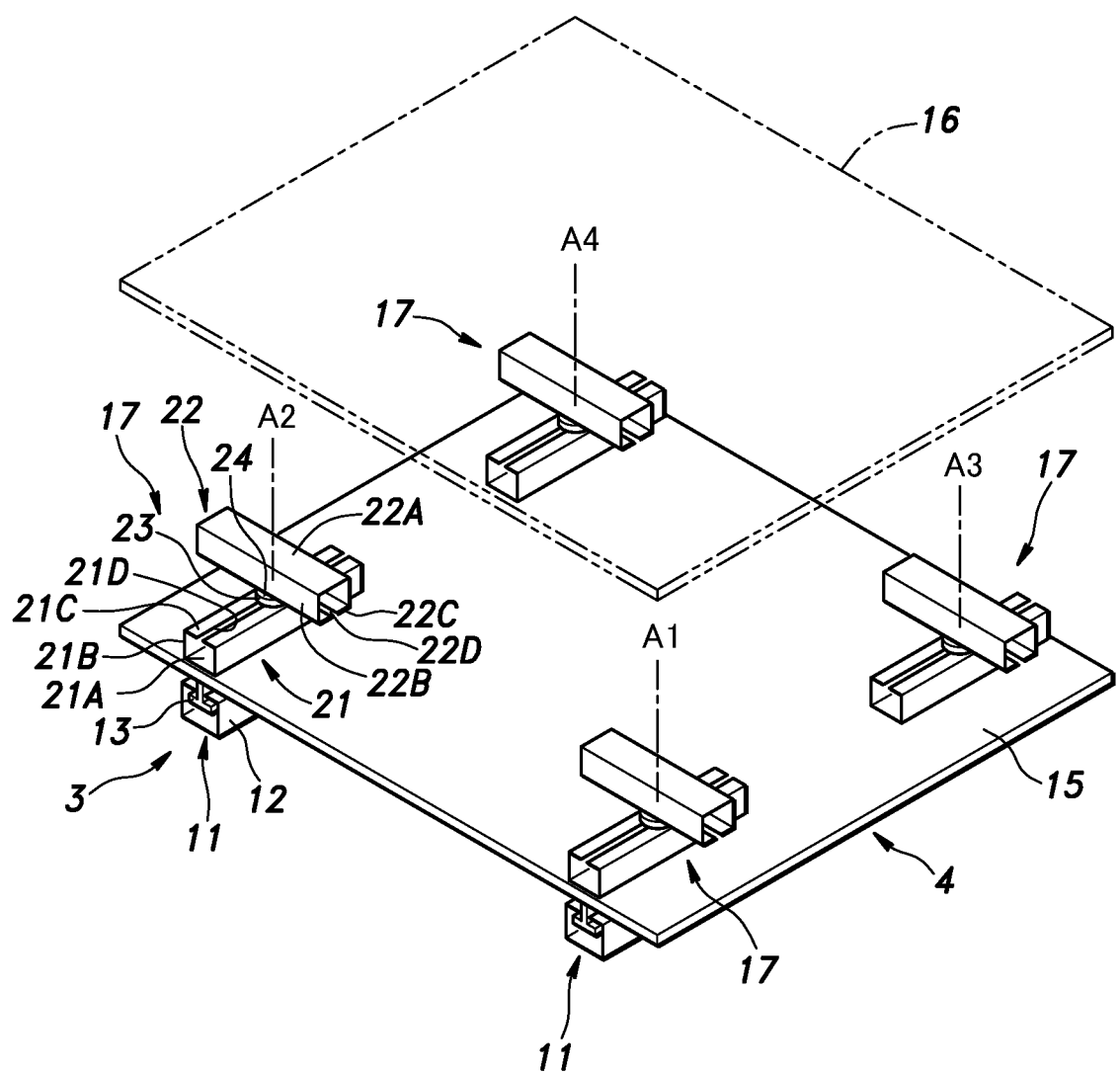
FIG. 2 is an exploded perspective view showing a slide device and a rotation device.

As shown in FIGS. 1 and 2, the slide device 3 includes a pair of left and right slide rails 11 extending in the fore and aft direction. Each slide rail 11 includes a lower slide rail 12 and an upper slide rail 13 that are slidably movable relative to each other. The lower slide rail 12 extends in the fore and aft direction and is joined to the upper surface of the floor 2. The upper slide rail 13 extends in the fore and aft direction and is supported by the lower slide rail 12 so as to be movable in the fore and aft direction. Each slide rail 11 is provided with a lock device (not shown in the drawings) for restricting the slide movement of the upper slide rail 13 relative to the lower slide rail 12.

Figure 3:
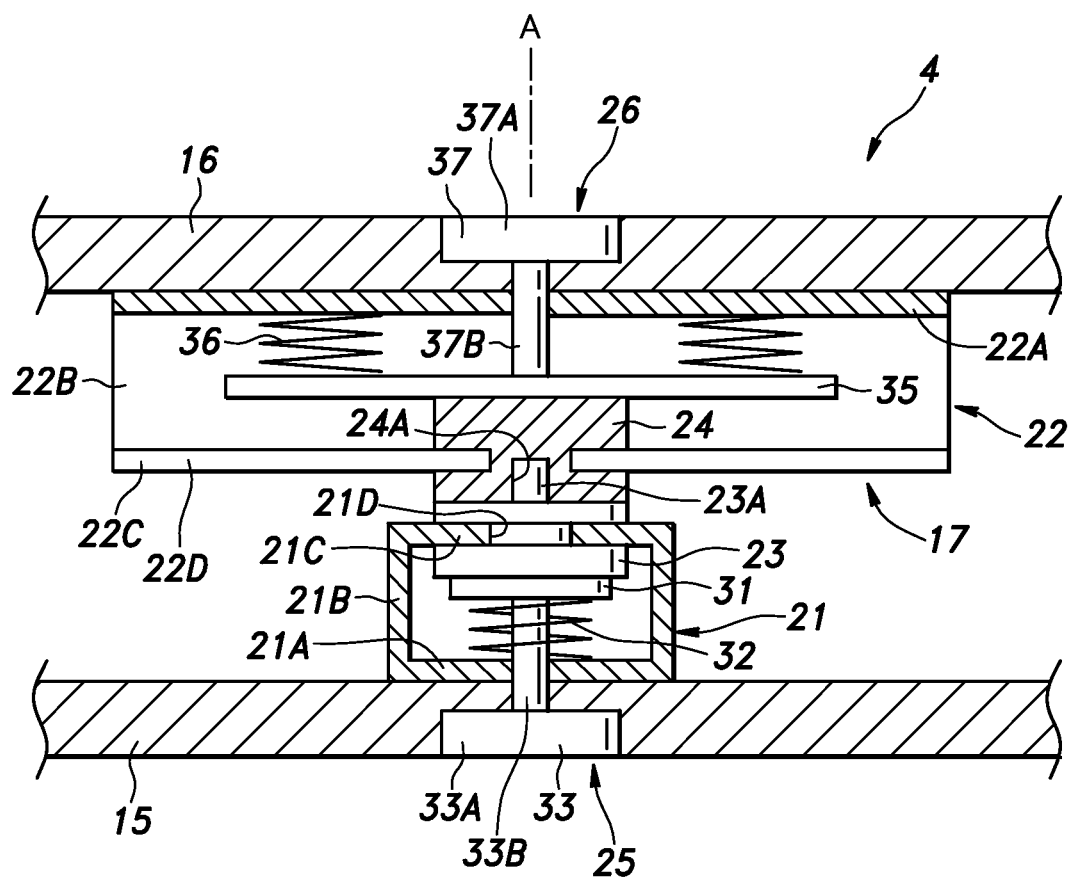
FIG. 3 is a sectional view of one of rotation shaft units of the rotation device.

As shown in FIGS. 2 and 3, the rotation device 4 includes a lower plate 15 and an upper plate 16 that vertically oppose each other and four rotation shaft units 17 interposed between the lower plate 15 and the upper plate 16. The number of rotation shaft units 17 is four in the present embodiment but may be any other plural number, such as two or three, in another embodiment. The lower plate 15 is a plate-like member having vertically facing surfaces and is joined to upper parts of the left and right upper slide rails 13. The upper plate 16 is a plate-like member having vertically facing surfaces and is joined to a lower part of the seat cushion 7.

The four rotation shaft units 17 are arranged between the lower plate 15 and the upper plate 16 at a front left part, a front right part, a rear left part, and a rear right part, respectively. Each rotation shaft unit 17 includes a lower rail 21, an upper rail 22, a lower slider 23, an upper slider 24, a lower restriction member 25, and an upper restriction member 26.

The lower rail 21 is joined to an upper surface of the lower plate 15 and extends in a first horizontal direction. The lower rail 21 is fixed to the floor 2 via the lower plate 15 and the slide device 3. The upper rail 22 is joined to the upper plate 16 and extends in a second horizontal direction that is different from the extension direction of the lower rail 21 (first horizontal direction). The upper rail 22 is fixed to the seat cushion 7 via the upper plate 16. In the present embodiment, the first horizontal direction, which is the extension direction of the lower rail 21 coincides with the fore and aft direction, and the second horizontal direction, which is the extension direction of the upper rail 22, coincides with the lateral direction (vehicle width direction) that is orthogonal to the first horizontal direction. The upper rail 22 is arranged above the lower rail 21. As seen from above, the upper rail 22 is arranged at a position crossing the lower rail 21.

The lower rail 21 includes a lower rail bottom wall 21A joined to the lower plate 15, a pair of lower rail side walls 21B protruding upward from the respective side edges of the lower rail bottom wall 21A, and a pair of lower rail top walls 21C protruding from the upper ends of the respective lower rail side walls 21B toward each other. The lower rail bottom wall 21A, the pair of lower rail side walls 21B, and the pair of lower rail top walls 21C extend in the first horizontal direction, and a lower rail slit 21D extending in the first horizontal direction is formed between the pair of lower rail top walls 21C.

The upper rail 22 includes an upper rail top wall 22A joined to the upper plate 16, a pair of upper rail side walls 22B protruding downward from the respective side edges of the upper rail top wall 22A, and a pair of upper rail bottom walls 22C protruding from the lower edges of the respective upper rail side walls 22B toward each other. The upper rail top wall 22A, the pair of upper rail side walls 22B, and the pair of upper rail bottom walls 22C extend in the second horizontal direction, and an upper rail slit 22D extending in the second horizontal direction is formed between the pair of upper rail bottom walls 22C.

The lower slider 23 is passed through the lower rail slit 21D and engaged by the edge portions of the pair of lower rail top walls 21C. The lower slider 23 is restricted in vertical movement by abutment against the lower rail top walls 21C while being slidably movable in the extension direction of the lower rail 21 by moving in the lower rail slit 21D.

The upper slider 24 is passed through the upper rail slit 22D and engaged by the edge portions of the pair of upper rail bottom walls 22C. The upper slider 24 is restricted in vertical movement by abutment against the upper rail bottom walls 22C while the upper slider 24 is slidably movable in the extension direction of the upper rail 22 by moving in the upper rail slit 22D.

An upper end of the lower slider 23 is formed with a shaft portion 23A that protrudes vertically upward, while a lower end of the upper slider 24 is formed with a shaft receiving hole 24A that is recessed vertically upward and having a circular cross section. The shaft portion 23A and the shaft receiving hole 24A are provided with a known pull-out prevention means such as a C-ring. The shaft portion 23A is rotatably received in the shaft receiving hole 24A, whereby the lower slider 23 and the upper slider 24 are joined so as to be rotatable relative to each other about a vertically extending axis. The rotation axis between the lower slider 23 and the upper slider 24 constitutes a rotation axis A (A1, A2, A3, A4) of each rotation shaft unit 17.

The lower restriction member 25 includes a lower engagement member 31 positioned between the lower end of the lower slider 23 and the lower rail bottom wall 21A within the lower rail 21, a lower biasing member 32 interposed between the lower engagement member 31 and the lower rail bottom wall 21A to urge the lower engagement member 31 toward the lower slider 23, and a lower actuator 33 joined to the lower engagement member 31 and configured to move the lower engagement member 31 toward the lower rail bottom wall 21A against the urging force of the lower biasing member 32. The upper restriction member 26 includes an upper engagement member 35 positioned between the upper end of the upper slider 24 and the upper rail top wall 22A within the upper rail 22, an upper biasing member 36 interposed between the upper engagement member 35 and the upper rail top wall 22A to urge the upper engagement member 35 toward the upper slider 24, and an upper actuator 37 joined to the upper engagement member 35 and configured to move the upper engagement member 35 toward the upper rail top wall 22A against the urging force of the upper biasing member 36. The lower biasing member 32 and the upper biasing member 36 each may consist of a compression coil spring, a leaf spring or the like.

The lower engagement member 31 restricts the movement of the lower slider 23 relative to the lower rail 21 by engaging the lower surface of the lower slider 23. The contact surfaces of the lower engagement member 31 and the lower slider 23 may be formed with teeth that mesh with each other. The structure of the upper engagement member 35 and the upper slider 24 is the same as the structure of the lower engagement member 31 and the lower slider 23.

The lower actuator 33 and the upper actuator 37 each may consist of a solenoid, for example. The lower actuator 33 includes a main body 33A joined to the lower plate 15 and a drive shaft 33B extending from the main body 33A to pass through the lower rail bottom wall 21A and joined to the lower engagement member 31. The upper actuator 37 includes a main body 37A joined to the upper plate 16 and a drive shaft 37B extending from the main body 37A to pass through the upper rail top wall 22A and joined to the upper engagement member 35.

In a lock state of the rotation shaft unit 17, the lower actuator 33 is not activated and the lower engagement member 31 urged by the lower biasing member 32 engages the lower slider 23 to restrict the movement of the lower slider 23 relative to the lower rail 21. Also, the upper actuator 37 is not activated and the upper engagement member 35 urged by the upper biasing member 36 engages the upper slider 24 to restrict the movement of the upper slider 24 relative to the upper rail 22. At this time, the lower slider 23 and the upper slider 24 can rotate relative to each other about the rotation axis A.

In a lock release state of the rotation shaft unit 17, the lower actuator 33 is activated to cause the lower engagement member 31 to move in a direction away from the lower slider 23 against the urging force of the lower biasing member 32, whereby the lower slider 23 enabled to move relative to the lower rail 21. Also, the upper actuator 37 is activated to cause the upper engagement member 35 to move in a direction away from the upper slider 24 against the urging force of the upper biasing member 36, whereby the upper slider 24 is enabled to move relative to the upper rail 22.

By putting all of the four rotation shaft units 17 in the lock state, the rotation device 4 can fix the position of the upper plate 16 relative to the lower plate 15. When the rotation device 4 puts a selected one of the four rotation shaft units 17 in the lock state and the other three rotation shaft units 17 in the lock release state, the upper plate 16 is enabled to rotate relative to the lower plate 15 about the rotation axis A of the selected rotation shaft unit 17. When all of the four rotation shaft units 17 are put in the lock release state, the upper plate 16 is allowed to move in a horizontal direction and rotate relative to the lower plate 15.

Figure 4:
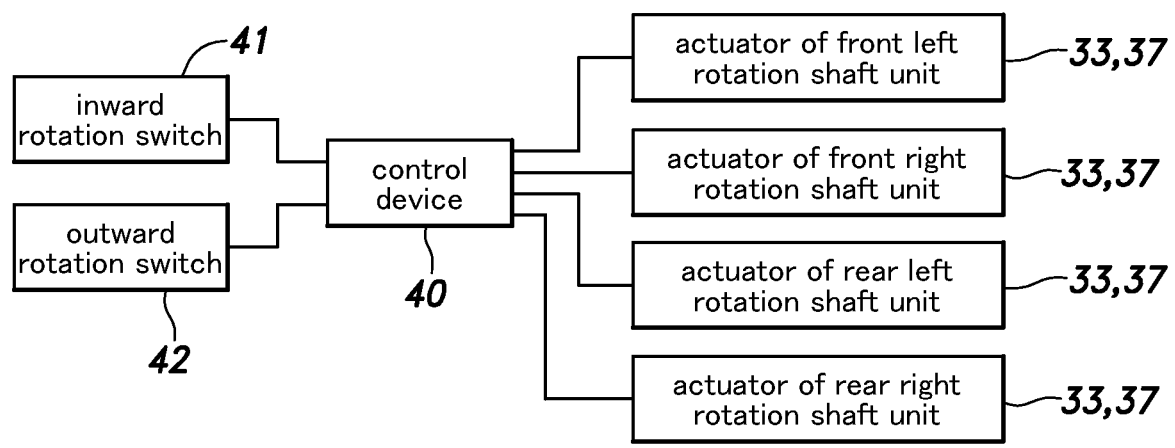
FIG. 4 is a block diagram showing a control system for the seat.

As shown in FIG. 4, the seat 1 includes a control device 40. The control device 40 is an electronic control device equipped with a CPU, a memory, and drivers. The control device 40 is with connected with an inward rotation switch 41 and an outward rotation switch 42 for allowing the occupant to select the rotation direction of the seat 1 and sets of the actuators 33, 37 respectively for the four rotation shaft units 17. Here, the inward rotation refers to a rotation in that the front end of the seat cushion 7 is rotated from the initial position inward with respect to the vehicle width direction while the outward rotation refers to a rotation in that the front end of the seat cushion 7 is rotated from the initial position outward with respect to the vehicle width direction.

The inward rotation switch 41 and the outward rotation switch 42 each outputs an ON signal to the control device 40 while being operated by the occupant. The inward rotation switch 41 and the outward rotation switch 42 are arranged on a side surface of the seat cushion 7. The control device 40 controls the activation of the actuators 33, 37 of each of the four rotation shaft units 17 to independently put the four rotation shaft units 17 in the lock state or the lock release state.

The control device 40 changes the lock state and the lock release state of the four rotation shaft units 17 between the cases where neither of the inward rotation switch 41 and the outward rotation switch 42 is operated, where the inward rotation switch 41 is operated, and where the outward rotation switch 42 is operated.

In the present embodiment, the control device 40 puts all of the rotation shaft units 17 in the lock state when the ON signal is not received from either of the inward rotation switch 41 and the outward rotation switch 42. Thereby, the rotation of the rotation device 4 is restricted and the seat cushion 7 is prevented from moving relative to the floor 2.

While the ON signal is received from the inward rotation switch 41, the control device 40 puts the rear left rotation shaft unit 17 in the lock state and the remaining front left, front right, and rear right rotation shaft units 17 in the lock release state. Thereby, the rotation device 4 is allowed to rotate about the rotation axis A3 of the rear left rotation shaft unit 17 and the seat cushion 7 can rotate relative to the floor 2 about the rotation axis A3 of the rear left rotation shaft unit 17.

Further, while the ON signal is received from the outward rotation switch 42, the control device 40 puts the front right rotation shaft unit 17 in the lock state and the remaining front left, rear left, and rear right rotation shaft units 17 in the lock release state. Thereby, the rotation device 4 is allowed to rotate about the rotation axis A2 of the front right rotation shaft unit 17 and the seat cushion 7 can rotate relative to the floor 2 about the rotation axis A2 of the front right rotation shaft unit 17.

The rotation axis A that serves as the center of rotation of the seat 1 changes between when the inward rotation switch 41 is operated and when the outward rotation switch 42 is operated. Namely, the rotation axis A about which the rotation is allowed can be selected in accordance with the rotation direction of the seat 1.

Figure 5:
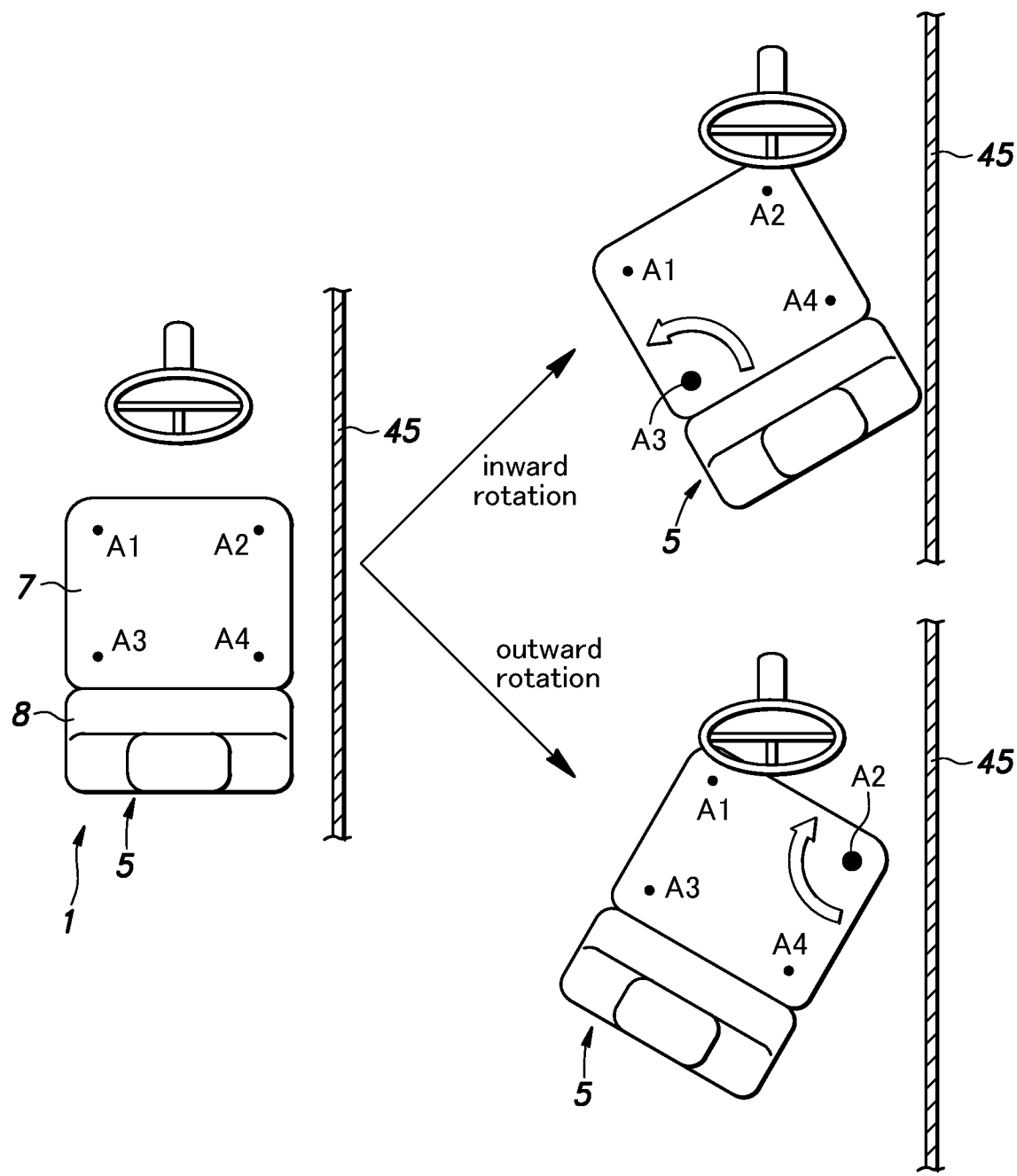
FIG. 5 is an explanatory diagram showing the mode of rotation of the seat at the time of inward rotation and outward rotation.

As shown in FIG. 5, when the inward rotation switch 41 is operated, the seat cushion 7 rotates about the rotation axis A3 of the rear left rotation shaft unit 17, whereby the contact between the seat back 8 and a passenger compartment side wall 45 positioned on the side of the seat 1 can be avoided. In a case where the seat 1 is a driver's seat provided in a front right portion of the passenger compartment, the passenger compartment side wall 45 is configured by a door, a pillar, and the like positioned to the right of the seat 1. When the seat body 5 undergoes inward rotation, the rotation axis A is selected to be the rotation axis A3 (or A4) located behind the center of the seat cushion 7, whereby the contact between the seat body 5 and the passenger compartment side wall 45 can be avoided. More preferably, when the seat body 5 undergoes inward rotation, the rotation axis A is selected to be the rotation axis A3 located behind the center of the seat cushion 7 and inward of the same with respect to the vehicle width direction.

When the outward rotation switch 42 is operated, the seat cushion 7 is caused to rotate about the rotation axis A2 of the front right rotation shaft unit 17, whereby the contact between the front end of the seat cushion 7 and the passenger compartment side wall 45 can be avoided. When the seat body 5 undergoes outward rotation, the rotation axes A is selected to be the rotation axes A2 (or A1) located in front of the center of the seat cushion 7, whereby the contact between the seat body 5 and the passenger compartment side wall 45 can be avoided.

Second Embodiment

Figure 6:
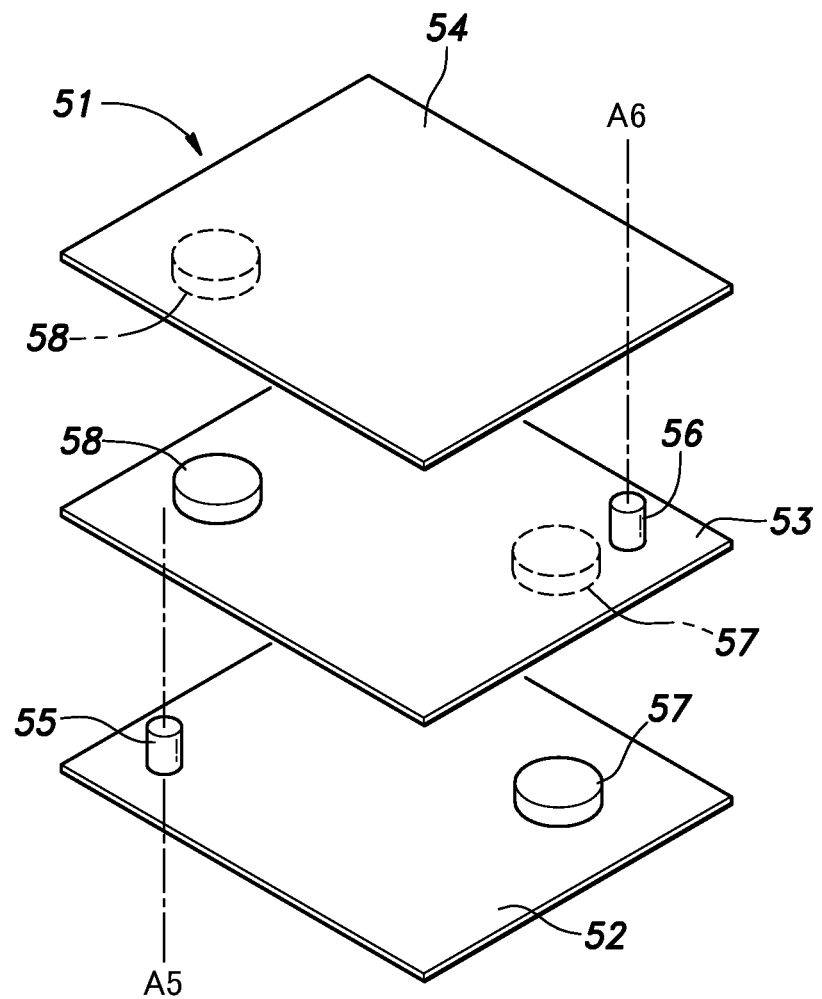
FIG. 6 is a side view of a seat according to the second embodiment.
Figure 7:
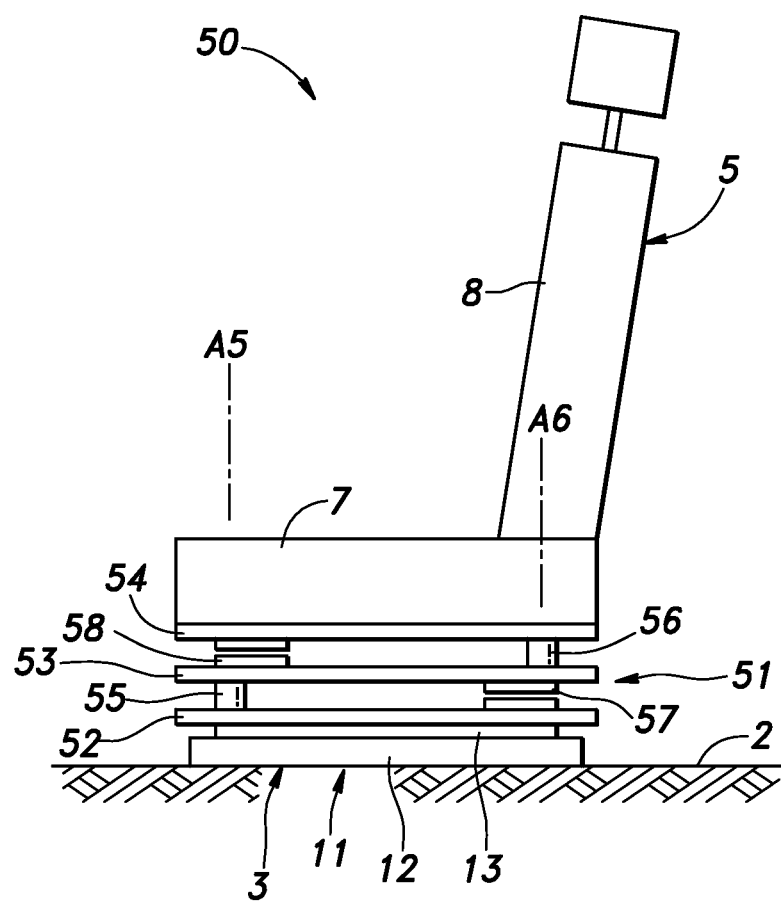
FIG. 7 is an exploded perspective view showing a rotation device according to the second embodiment.

A seat 50 according to the second embodiment differs from the seat 1 according to the first embodiment with respect to the structure of a rotation device 51. As shown in FIGS. 6 and 7, the rotation device 51 includes: a first plate 52, a second plate 53, and a third plate 54 that are arranged vertically; a first rotation shaft 55 extending vertically and connecting the first plate 52 and the second plate 53 in a rotatable manner; a second rotation shaft 56 extending vertically and connecting the second plate 53 and the third plate 54 in a rotatable manner; a first rotation restriction device 57 provided between the first plate 52 and the second plate 53; and a second rotation restriction device 58 provided between the second plate 53 and the third plate 54.

The first rotation shaft 55 is located in a front part of the rotation device 4 (a part of the rotation device 4 in front of the center thereof with respect to the fore and aft direction), and the second rotation shaft 56 is located in a rear part of the rotation device 4 (a part of the rotation device 4 behind the center thereof with respect to the fore and aft direction). Further, the first rotation shaft 55 may be located more inward of the passenger compartment than the center of the rotation device 4 with respect to the vehicle width direction, and the second rotation shaft 56 may be located more outward of the passenger compartment than the center of the rotation device 4 with respect to the vehicle width direction.

The first rotation restriction device 57 and the second rotation restriction device 58 are connected to the control device 40 and are controlled by the control device 40. The first rotation restriction device 57 is a device for selectively restricting the relative rotation of the first plate 52 and the second plate 53, and the second rotation restriction device 58 is a device for selectively restricting the relative rotation of the second plate 53 and the third plate 54. The first rotation restriction device 57 and the second rotation restriction device 58 each may include a solenoid and a connecting pin caused to advance and retreat by the solenoid, for example, such that the connecting pin joins the adjoining plates. Alternatively, the first rotation restriction device 57 and the second rotation restriction device 58 each may consist of an electromagnetic clutch such that the adjoining plates are joined by magnetic force.

While the ON signal is received from the inward rotation switch 41, the control device 40 puts the first rotation restriction device 57 in the lock state and the second rotation restriction device 58 in the lock release state. This restricts the rotation about the first rotation shaft 55 (rotation axis A5) and permits the rotation about the second rotation shaft 56 (rotation axis A6). Also, while the ON signal is received from the outward rotation switch 42, the control device 40 puts the second rotation restriction device 58 in the lock state and the first rotation restriction device 57 in the lock release state. This restricts the rotation of the rotation device 51 about the second rotation shaft 56 (rotation axis A6) and permits the rotation about the first rotation shaft 55 (rotation axis A5). Further, when the ON signal is not received from either of the inward rotation switch 41 and the outward rotation switch 42, the control device 40 puts the first rotation restriction device 57 and the second rotation restriction device 58 in the lock state. This restricts the rotation of the rotation device 51.

In this embodiment, the rotation device 51 is configured to include three rotation members, i.e., the first to third plates 52-54, but in another embodiment, the number of rotation members may be four or more, and each pair of adjoining rotation members may be connected by a rotation shaft and a rotation restriction device. By constructing in this way, it is possible to increase the number of selectable rotation shafts of the rotation device 51.

Third Embodiment

Figure 8:
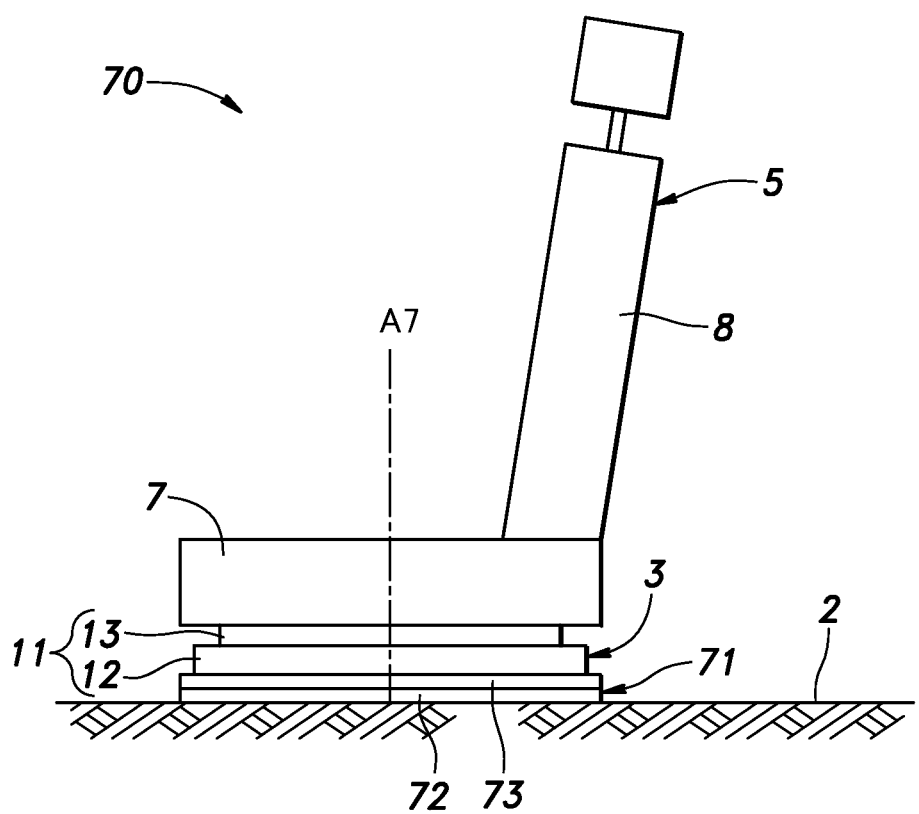
FIG. 8 is a side view of a seat according to the third embodiment.

A seat 70 according to the third embodiment differs from the seat 1 according to the first embodiment with respect to the structure of a rotation device 71 and the arrangement of the slide device 3 and the rotation device 71. As shown in FIG. 8, the rotation device 71 includes a lower rotation member 72 provided on the floor 2 and an upper rotation member 73 provided on the lower rotation member 72 so as to be rotatable about a rotation axis A7 extending substantially vertically. The lower rotation member 72 and the upper rotation member 73 are each formed in a plate-like shape having a vertically facing surface. The rotation axis A7 of the rotation device 71 is located substantially at the center of the rotation device 71 as seen in plan view. Each lower slide rail 12 of the slide device 3 is provided on the upper surface of the upper rotation member 73. The seat cushion 7 is provided on the upper ends of the upper slide rails 13. Each slide rail 11 is arranged to extend in the fore and aft direction in the initial state.

As shown in FIG. 9, a rotation direction restriction device 74 is provided between the upper rotation member 73 and the seat cushion 7. The rotation direction restriction device 74 includes a restriction wall 75 provided on the upper surface of the upper rotation member 73, and a front stopper 76 and a rear stopper 77 protruding downward from the lower surface of the seat cushion 7. The restriction wall 75 extends in the fore and aft direction and radially with the rotation axis A7 being the center. The front stopper 76 is provided in the lower surface front end of the seat cushion 7, and the rear stopper 77 is provided in the lower surface rear end of the seat cushion 7. The front stopper 76 and the rear stopper 77 are located inward of the restriction wall 75 with respect to the vehicle width direction. The restriction wall 75 is formed to have a length in the fore and aft direction shorter than the distance between the front stopper 76 and the rear stopper 77.

Figure 9A:
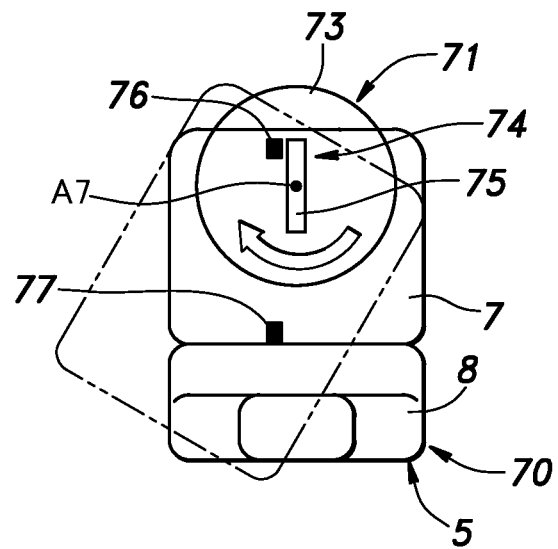
FIG. 9 is an explanatory diagram showing the mode of rotation of the seat according to the third embodiment at the time of (A) inward rotation and (B) outward rotation.

In the seat 70, the slide device 3 allows the seat body 5 to slidably move relative to the rotation device 71. Therefore, the relative position between the rotation axis A7 of the rotation device 71 and the seat body 5 can change. As shown in FIG. 9A, by causing the slide device 3 to place the seat body 5 at a relatively rear position with respect to the rotation device 71, the rotation axis A7 can be placed in a front portion of the seat body 5. At this time, the front stopper 76 is positioned inward of the front end of the restriction wall 75 with respect to the vehicle width direction, and the inward rotation of the seat cushion 7 is restricted by an abutment between the front end of the restriction wall 75 and the front stopper 76. Thereby, the seat cushion 7 is allowed to undergo only outward rotation.

Figure 9B:
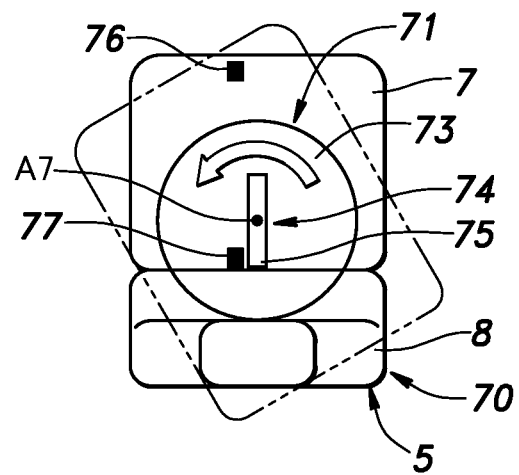

As shown in FIG. 9B, by causing the slide device 3 to place the seat body 5 at a relatively front position with respect to the rotation device 71, the rotation axis A7 can be placed in a rear portion of the seat body 5. At this time, the rear stopper 77 is positioned inward of the rear end of the restriction wall 75 with respect to the vehicle width direction, and the outward rotation of the seat cushion 7 is restricted by an abutment between the rear end of the restriction wall 75 and the rear stopper 77. Thereby, the seat cushion 7 is allowed to undergo only inward rotation. In this way, the rotation direction of the upper rotation member 73 relative to the lower rotation member 72 is restricted in accordance with the position of the upper slide rail 13 relative to the lower slide rail 12.

Fourth Embodiment

Figure 10:
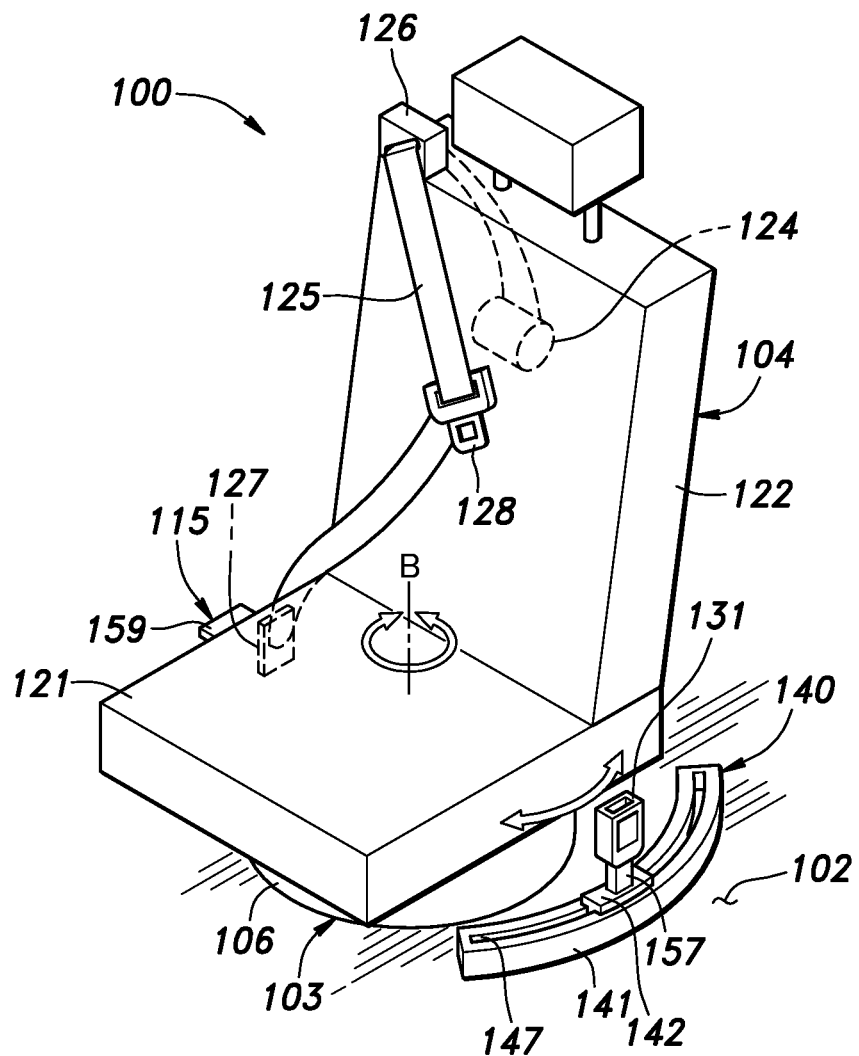
FIG. 10 is a perspective view of a seat for a motor vehicle according to the fourth embodiment.

As shown in FIG. 10, a seat 101 includes a rotation device 103 provided on an upper surface of a floor 102 of a motor vehicle and a seat body 104 provided on an upper part of the rotation device 103. The seat 101 may be any of a driver's seat, a front passenger seat, and a rear seat. In this embodiment, the seat 101 is configured as a driver's seat located in a right front part of the passenger compartment.

Figure 11:
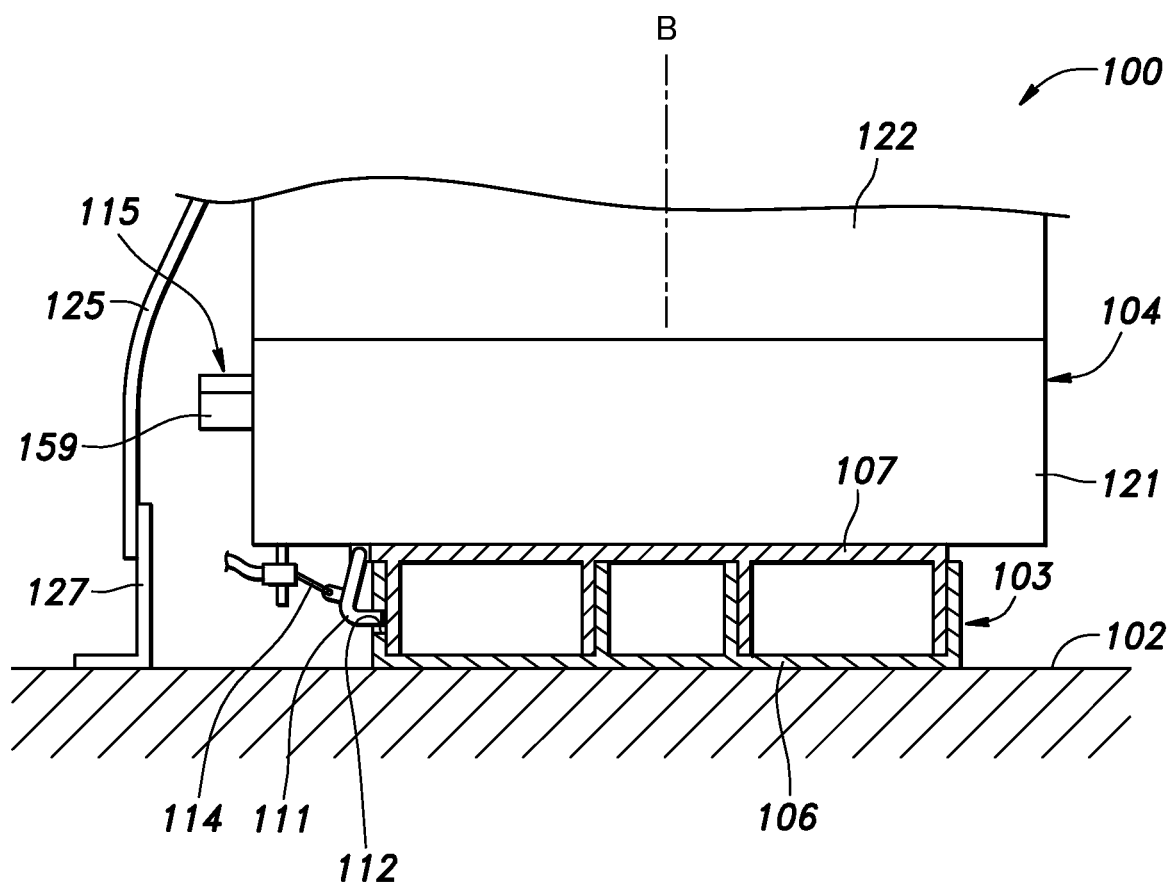
FIG. 11 is a transverse sectional view of a rotation device.

As shown in FIGS. 10 and 11, the floor 102 extends substantially horizontally. The rotation device 103 includes a lower rotation member 106 and an upper rotation member 107 provided on the lower rotation member 106 so as to be rotatable about a rotation axis B extending substantially vertically. The lower rotation member 106 and the upper rotation member 107 are each formed in a plate-like shape having a vertically facing surface. The rotation axis B of the rotation device 103 is located substantially at the center of the rotation device 103 as seen in plan view. The lower rotation member 106 and the upper rotation member 107 preferably engage each other at their outer peripheral edges in a rotatable manner. The lower rotation member 106 is joined to the upper surface of the floor 102.

The rotation device 103 includes a first lock member 111 configured to restrict the rotation of the upper rotation member 107 relative to the lower rotation member 106. The first lock member 111 is provided on one of the lower rotation member 106 and the upper rotation member 107 and is movable between a lock position where the first lock member 111 engages the other of the lower rotation member 106 and the upper rotation member 107 and a lock release position where the first lock member 111 is separated from the other of the lower rotation member 106 and the upper rotation member 107.

In this embodiment, the first lock member 111 has a claw at a free end thereof and is rotatably provided on an outer periphery of the upper rotation member 107, and an engagement hole 112 configured to engage the claw of the first lock member 111 is formed in an outer periphery of the lower rotation member 106. With the claw of the first lock member 111 inserted in the engagement hole 112, the first lock member 111 restricts the rotation of the upper rotation member 107 relative to the lower rotation member 106.

Figure 13:
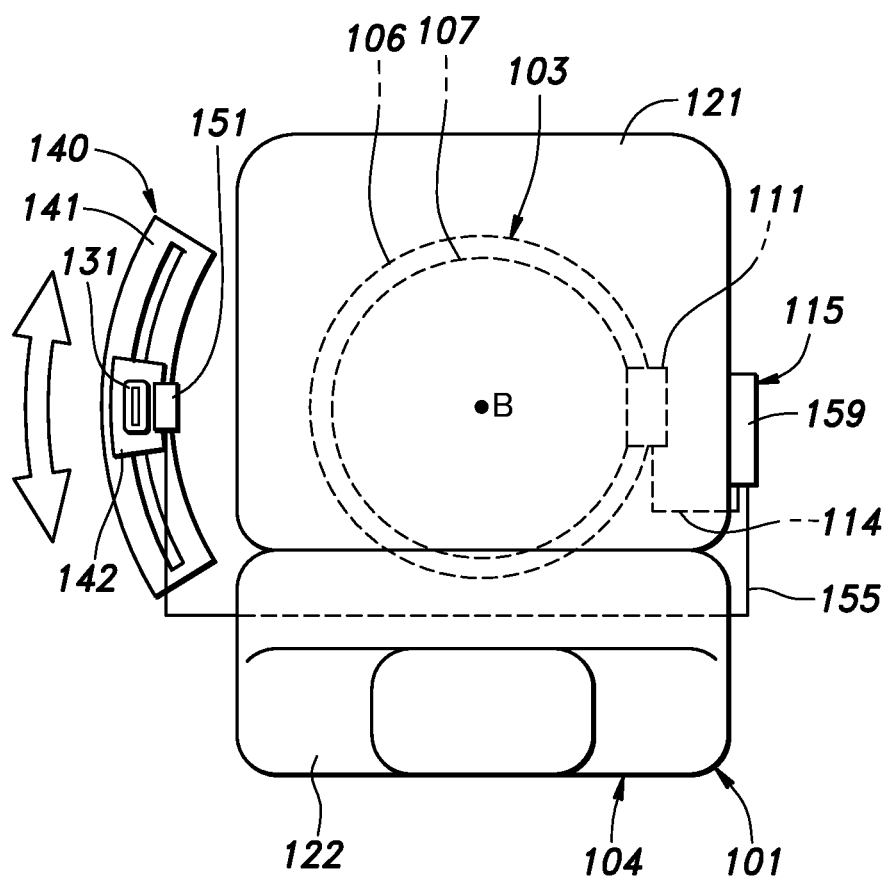
FIG. 13 is an explanatory diagram showing the structure of the motor vehicle seat.

The first lock member 111 is urged toward the lock position by a biasing member (not shown in the drawings) provided between the first lock member 111 and the upper rotation member 107 to be placed in the lock position at the normal time. Also, as shown in FIG. 13, one end of a first control cable 114 is joined to the first lock member 111. The first control cable 114 is joined to the first lock member 111 at the one end thereof and to a later-described operation input device 115 at the other end thereof.

As shown in FIG. 10, the seat body 104 includes a seat cushion 121 serving as a seating portion for supporting the buttocks and thighs of the seated occupant from below and a seat back 122 serving as a backrest for supporting the back of the seated occupant from rear. The seat cushion 121 and the seat back 122 each include a frame serving as a skeleton, a cushion pad supported by the frame, and a skin member covering the frame and the cushion pad. A lower part of the seat cushion 121 is joined to an upper part of the upper rotation member 107.

A belt retractor 124 for winding up a seat belt 125 is provided inside the seat back 122. A belt guide 126 for defining the path of the seat belt 125 is provided on an upper end of the seat back 122. The seat belt 125 extends upward from the belt retractor 124 inside the seat back 122 and passes through the belt guide 126 to the front side of the seat back 122. One end of the seat belt 125 is joined to a belt anchor 127 secured to the seat cushion 121. A tongue plate 128 is provided at a part of the seat belt 125 between the belt guide 126 and the belt anchor 127. The seat belt 125 is passed through a through-hole formed in the tongue plate 128, and the tongue plate 128 is movable along the length of the seat belt 125. The belt guide 126 and the belt anchor 127 are provided on one side of the seat body 104 with respect to the width direction.

A movement device 140 for supporting a buckle 131 to be movable relative to the floor 102 is provided on the floor 102. The buckle 131 has a slot for receiving the tongue plate 128 and is configured to be detachably joined to the tongue plate 128. The buckle 131 and the movement device 140 are arranged on the side of the seat body 104 opposite to the side on which the belt guide 126 is provided.

Figure 12:
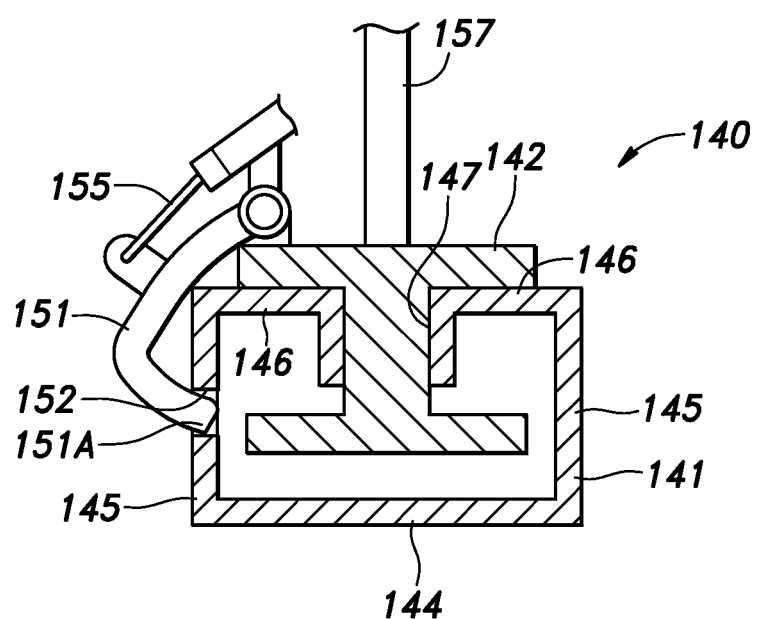
FIG. 12 is a transverse sectional view of a movement device.

As shown in FIG. 12, the movement device 140 includes a rail 141 provided on the floor 102 and a slider 142 movably provided on the rail 141. The rail 141 extends in a circular arc shape having a center coinciding with the rotation axis B of the rotation device 103. The slider 142 is supported by the rail 141 to be slidably movable along the length of the rail 141. Thereby, the slider 142 is movable relative to the floor 102 along a circular arc path having a center coinciding with the rotation axis B of the rotation device 103.

The rail 141 includes a rail bottom wall 144 joined to the floor 102, a pair of rail side walls 145 protruding upward from the respective side edges of the rail bottom wall 144, and a pair of rail top walls 146 protruding from the upper ends of the respective rail side walls 145 toward each other. The pair of rail top walls 146 defines a slit 147 therebetween.

The slider 142 is passed through the slit 147 and is engaged by the edge portions of the pair of rail top walls 146. The slider 142 is formed in a circular arc shape with the center coinciding with the rotation axis B as seen in plan view so that the slider 142 can be inserted into the rail 141 that is similarly formed in a circular arc shape. The slider 142 is restricted in vertical movement by abutment against the rail top walls 146 while being slidably movable in the extension direction of the rail 141 by moving in the slit 147.

The movement device 140 includes a second lock member 151 configured to selectively fix the slider 142 to the rail 141. The second lock member 151 is provided on one of the rail 141 and the slider 142 and is movable between a lock position where the second lock member 151 engages the other of the rail 141 and the slider 142 and a lock release position where the second lock member 151 is separated from the other of the rail 141 and the slider 142.

In this embodiment, the second lock member 151 has a claw 151A and is rotatably provided on a part of the slider 142 protruding from the rail 141, and an engagement hole 152 configured to engage the second lock member 151 is formed in the rail side wall 145. In the lock position, with the claw 151A inserted in the engagement hole 152, the second lock member 151 restricts the slide movement of the slider 142 relative to the rail 141.

The second lock member 151 is urged toward the lock position by a biasing member provided between the second lock member 151 and the slider 142 to be placed in the lock position at the normal time. As shown in FIG. 13, one end of a second control cable 155 is joined to the second lock member 151. The second control cable 155 is joined to the second lock member 151 at the one end thereof and to the operation input device 115 at the other end thereof. In another embodiment, the second lock member 151 may be mounted to an inner surface of the rail 141 so as to engage the slider 142 in the lock position and to be separated from the slider 142 in the lock release position.

As shown in FIG. 10, a part of the slider 142 projecting upward from the rail 141 is provided with an upward extending arm 15, and the buckle 131 is joined to the tip end of the arm 157.

The operation input device 115 is a member configured to receive an operation of the occupant and may consist of a rotatable lever or a strap that can be operated by pulling, for example. In this embodiment, the operation input device 115 consists of a lever 159 rotatably provided on a side portion of the seat cushion 121. The lever 159 is rotatable between an initial position and an operation position and is urged toward the initial position by a biasing member not shown in the drawings. When the lever 159 is in the initial position, the first and second control cables 114, 155 are relaxed, and the first and second lock members 111, 151 are in the lock position. On the other hand, when the lever 159 is in the operation position, the first and second control cables 114, 155 are pulled, and the first and second lock members 111, 151 are in the lock release position.

In the seat 101 configured as described above, in a normal state in which the lever 159 is in the initial position, the rotation device 103 and the movement device 140 are each in the lock state, and the rotation of the seat body 104 and the movement of the buckle 131 relative to the floor 102 are restricted. In the state where the movement of the buckle 131 is restricted as this, when a load is applied to the seat belt 125 from the occupant due to collision of the motor vehicle or the like, the buckle 131 is prevented from moving and the seat belt 125 can support the occupant appropriately.

Because the buckle 131 is provided on the floor 102 via the movement device 140 but without the shaft portion of the rotation device 103 (engagement portion between the lower rotation member 106 and the upper rotation member 107) therebetween, the inertial force acting on the occupant at the time of collision or the like is transmitted to the floor 102 via the seat belt 125 and the movement device 140, and the load applied to the shaft portion of the rotation device 103 can be suppressed. This reduces the stiffness required to the rotation device 103, and the size and weight of the rotation device 103 can be reduced.

When the occupant operates the lever 159 from the initial position to the operation position, the rotation device 103 is put in the lock release state so that the seat body 104 is rotatable relative to the floor 102, and the movement device 140 is put in the lock release state so that the buckle 131 is movable relative to the floor 102. In this state, the occupant can rotate the seat body 104 to an arbitrary rotational position and adjust the position of the buckle 131 in accordance with the rotational position of the seat body 104.

Because the occupant can switch both the rotation device 103 and the movement device 140 between the lock state and lock release state by operating the single lever 159, the adjustment of the position of the buckle 131 in accordance with the rotation of the seat body 104 is facilitated.

Because the rail 141 defining the movement path of the slider 142 is formed in a circular arc shape having a center coinciding with the rotation axis B of the rotation device 103, the buckle 131 can move along the circular arc path having a center coinciding with the rotation axis B. Therefore, the seat body 104 can be placed at an appropriate position in accordance with the rotation of the buckle 131.

Fifth Embodiment

Figure 14:
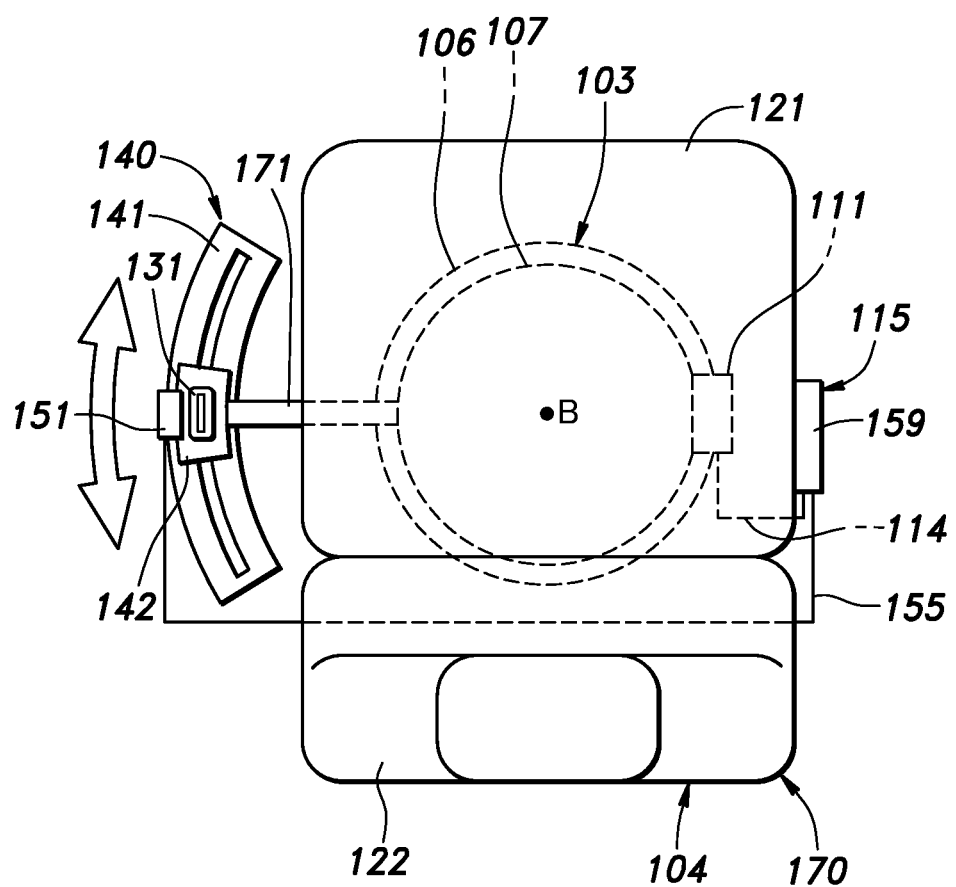
FIG. 14 is a perspective view of a seat for a motor vehicle according to the fifth embodiment.

As shown in FIG. 14, a seat 170 according to the fifth embodiment includes, in addition to the structure of the seat 101 according to the fourth embodiment, a connecting member 171 that connects the slider 142 with a part of the seat body 104 or the rotation device 103 that rotates together with the seat body 104. The other structure of the seat 170 is the same as that of the seat 101 according to the fourth embodiment.

In the seat 170 according to the fifth embodiment, the connecting member 171 is joined to the upper rotation member 107 and the slider 142. Owing to the connecting member 171, when the seat body 104 rotates, the slider 142 automatically moves in accordance with the rotation of the seat body 104. Therefore, it is unnecessary for the occupant to manually adjust the position of the buckle 131, and the rotating operation of the seat body 104 becomes easy.

Sixth Embodiment

Figure 15:
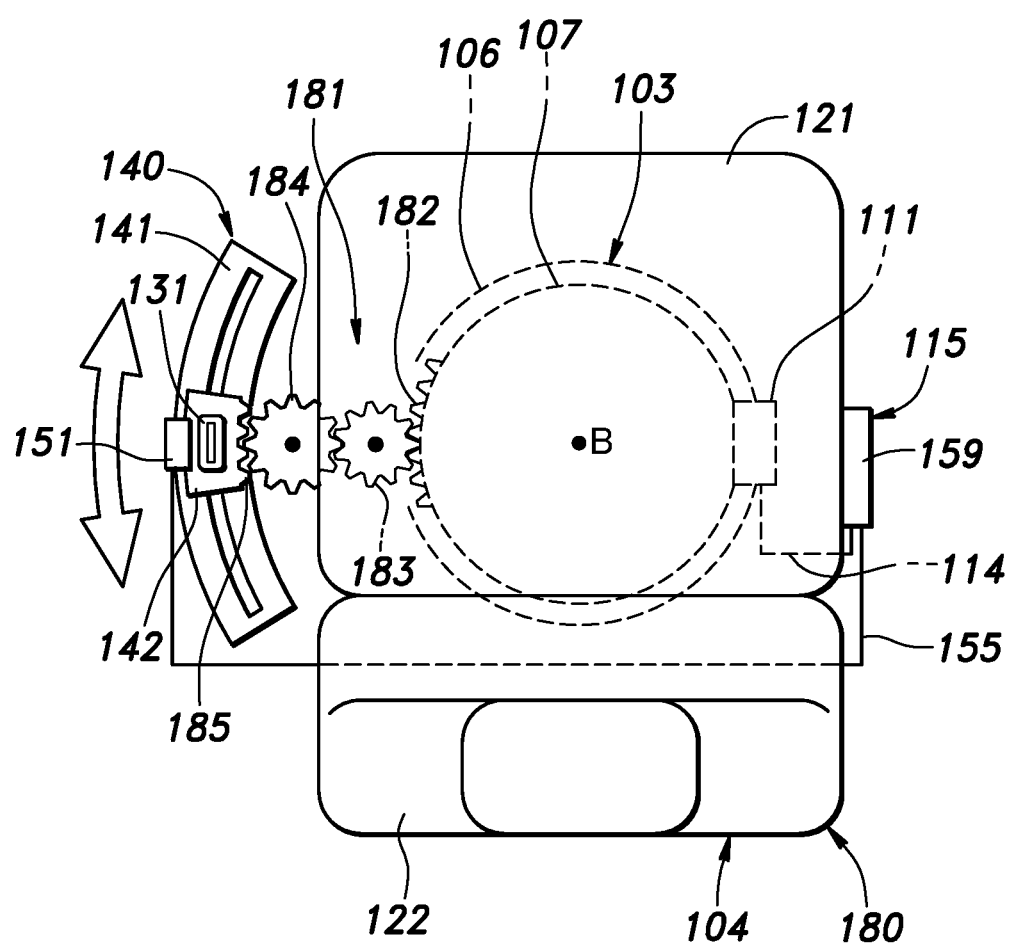
FIG. 15 is an explanatory diagram showing the structure of a motor vehicle seat according to the sixth embodiment.

As shown in FIG. 15, a seat 180 according to the sixth embodiment includes, in addition to the structure of the seat 101 according to the fourth embodiment, a drive unit 181 connecting the slider 142 with the upper rotation member 107 of the rotation device 103. The other structure of the seat 180 is the same as that of the seat 101 according to the fourth embodiment.

In the seat 180 according to the sixth embodiment, the drive unit 181 drives the slider 142 at a rotation angle having a predetermine ratio relative to the rotation angle of the rotation device 103. The drive unit 181 may be constituted of a gear train, for example. The drive unit 181 includes a first gear 182 formed on an outer periphery of the upper rotation member 107 and having a center coinciding with the rotation axis B, a second gear 183 rotatably supported on the floor 102 and meshing with the first gear 182, a third gear 184 rotatably supported on the floor 102 and meshing with the second gear 183, and a fourth gear 185 formed on an inner periphery of the slider 142 and meshing with the third gear 184. The fourth gear 185 is formed on an inner peripheral side of a circular arc shape having a center coinciding with the rotation axis B. According to this configuration, the buckle 131 can be automatically moved at a predetermined ratio in accordance with the rotation of the seat body 104.

The drive unit 181 may consist of a link mechanism in place of the gear train.

Seventh Embodiment

Figure 16:
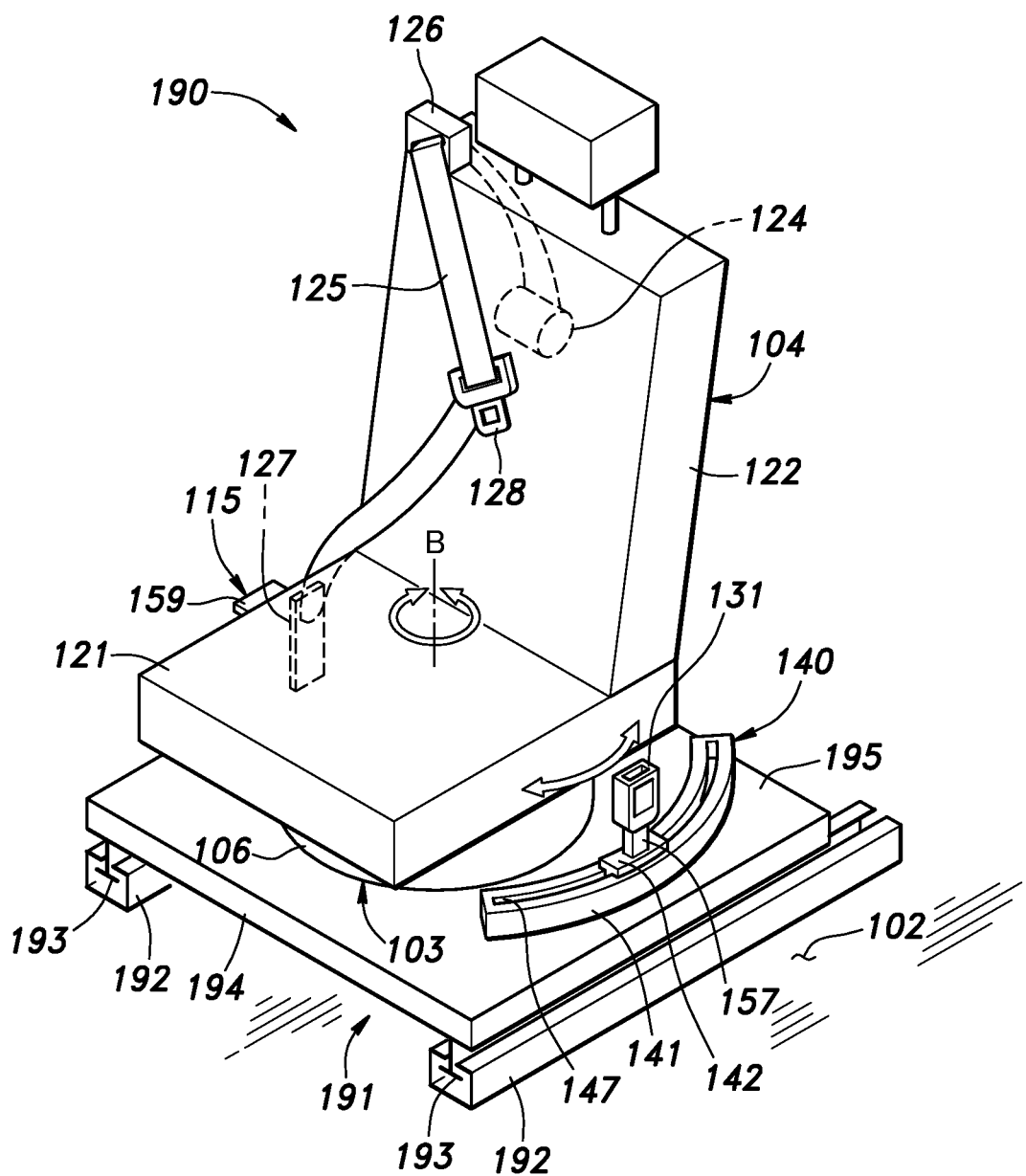
FIG. 16 is a perspective view of a seat for a motor vehicle according to the seventh embodiment.

As shown in FIG. 16, a seat 190 according to the seventh embodiment includes, in addition to the structure of the seat 101 according to the fourth embodiment, a slide device 191 between the floor 102 and the rotation device 103. In addition, the seat 190 according to the seventh embodiment differs from the seat 101 according to the fourth embodiment in that the rail 141 of the movement device 140 is provided on a member of the slide device 191 adjacent to the rotation device 103 instead of being provided on the floor 102. The other structure of the seat 190 is the same as that of the seat 101 according to the fourth embodiment.

The slide device 191 includes a pair of left and right lower rails 192 provided on the floor 102 and extending in the fore and aft direction, a pair of left and right upper rails 193 provided on the respective lower rails 192 in a slidably movable manner, and a base member 194 having left and right parts joined to the respective upper rails 193. The base member 194 is formed in a plate-like shape having vertically facing surfaces including a lower surface joined to the upper rails 193 and an upper surface joined to the lower rotation member 106. The base member 194 is provided on a side thereof with an extension 195 that extends out laterally relative to the lower rotation member 106. The rail 141 of the movement device 140 is joined to the upper surface of the extension 195.

Because the slide device 191 is provided between the rotation device 103 and the floor 102, the seat body 104 and the buckle 131 can slide relative to the floor 102. Because the rotation device 103 and the movement device 140 are both provided on the base member 194, when the seat body 104 is moved by the slide device 191, the position of the rail 141 relative to the rotation axis B does not change. Therefore, the buckle 131 can be placed at an appropriate position in accordance with the rotational position of seat the body 104.

The seat 190 according to the seventh embodiment may be also provided with the connecting member 171 that connects the upper rotation member 107 and the slider 142.

Concrete embodiments have been described in the foregoing, but the present invention is not limited by the above embodiments and various modifications are possible. The above-described structures of the rotation devices 4, 51, 71 are mere examples only and are not limiting. The rotation device may have various structures so long as it enables rotation about a selected one of the multiple rotation axes and restricts rotation about any of the remaining rotation axis.

As a modification of the seat 101 according to the fourth embodiment, it is possible to provide two operation input devices 115, one for each of the first and second control cables 114, 155. With such a configuration, it is possible to switch the rotation device 103 and the movement device 140 independently of each other between the lock state and the lock release state.

Glossary 1, 50, 70 seat
2 floor
3 slide device
4, 51, 71 rotation device
7 seat cushion
8 seat back
11 slide rail
12 lower slide rail
13 upper slide rail
15 lower plate
16 upper plate
17 rotation shaft unit
21 lower rail
22 upper rail
23 lower slider
24 upper slider
25 lower restriction member
26 upper restriction member
31 lower engagement member
32 lower biasing member
33 lower actuator
35 upper engagement member
36 upper biasing member
37 upper actuator
40 control device
41 inward rotation switch
42 outward rotation switch
45 passenger compartment side wall
52 first plate
53 second plate
54 third plate
55 first rotation shaft
56 second rotation shaft
57 first rotation restriction device
58 second rotation restriction device
72 lower rotation member
73 upper rotation member
74 rotation direction restriction device
A (A1-A7) rotation axis
101, 170, 180, 190 seat
102 floor
103 rotation device
104 seat body
106 lower rotation member
107 upper rotation member
111 first lock member
114 first control cable
115 operation input device
121 seat cushion
122 seat back
125 seat belt
131 buckle
140 movement device
141 rail
142 slider
151 second lock member
155 second control cable
157 arm
159 lever

171 connecting member
181 drive unit
B rotation axis

The invention claimed is:

1. A vehicle seat, comprising a seat cushion provided on a floor of a vehicle and a seat back provided on the seat cushion, wherein:
   the seat cushion is provided so as to be rotatable relative to the floor about a selected one of multiple rotation axes extending substantially vertically,
   a rotation device is provided between the floor and the seat cushion, the rotation device being configured to enable rotation about the selected one of the multiple rotation axes while restricting rotation about any of the remaining rotation axes,
   the rotation device comprises multiple rotation shaft units, and
   each of the multiple rotation shaft units comprises:
      a lower rail extending in a first horizontal direction;
      an upper rail extending in a second horizontal direction different from the first horizontal direction;
      a lower slider provided on the lower rail to be slidably movable thereon;
      an upper slider provided on the upper rail to be slidably movable thereon and coupled with the lower slider to be rotatable about an axis extending substantially vertically; and
      restriction members configured to selectively restrict movement of the lower slider relative to the lower rail and movement of the upper slider relative to the upper rail.

2. The vehicle seat according to claim 1, wherein the rotation axes include a front rotation axis located in a front part of the seat cushion and a rear rotation axis located in a rear part of the seat cushion,
   the restriction members of each of the multiple rotation shaft units are controlled by a control device connected with an inward rotation switch and an outward rotation switch, and
   the rotation device enables rotation of the seat cushion about the rear rotation axis at a time of an inward rotation for turning the front part of the seat cushion relative to the rear part of the seat cushion inward with respect to a widthwise direction of the vehicle.

3. The vehicle seat according to claim 2, wherein the rear rotation axis is located more inward with respect to the widthwise direction of the vehicle than a widthwise center of the seat cushion.

4. The vehicle seat according to claim 1, wherein the rotation axes include a front rotation axis located in a front part of the seat cushion and a rear rotation axis located in a rear part of the seat cushion,
   the restriction members of each of the multiple rotation shaft units are controlled by a control device connected with an inward rotation switch and an outward rotation switch, and
   the rotation device enables rotation of the seat cushion about the front rotation axis at a time of an outward rotation for turning the front part of the seat cushion relative to the rear part of the seat cushion outward with respect to a widthwise direction of the vehicle.

* * * * *